No. 725,934. PATENTED APR. 21, 1903.
J. E. COOPER.
WHIFFLETREE HOOK.
APPLICATION FILED OCT. 15, 1901.
NO MODEL.
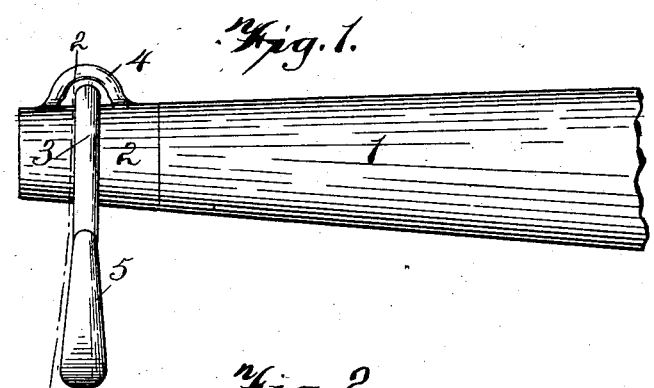
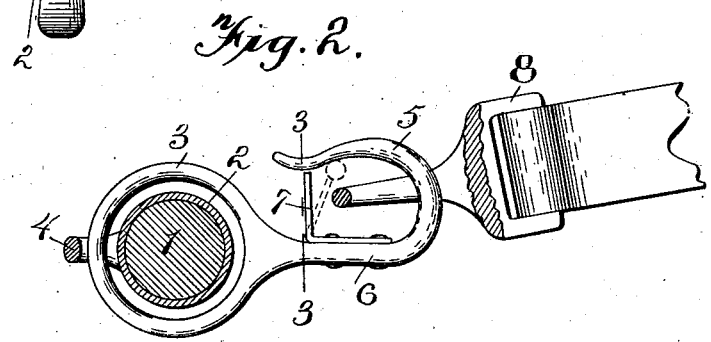
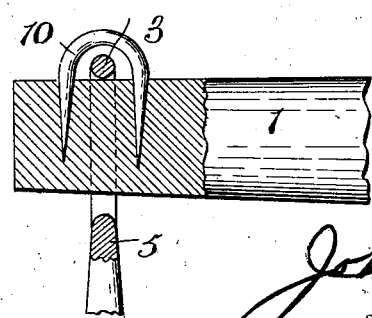
Witnesses
Geo. E. Fuch
M. Evans
Inventor
John E. Cooper
By S. H. Evans Attorney

UNITED STATES PATENT OFFICE.

JOHN E. COOPER, OF TAMPICO, VIRGINIA.

WHIFFLETREE-HOOK.

SPECIFICATION forming part of Letters Patent No. 725,934, dated April 21, 1903.

Application filed October 15, 1901. Serial No. 78,725. (No model.)

*To all whom it may concern:*

Be it known that I, JOHN E. COOPER, a citizen of the United States, residing at Tampico, in the county of York and State of Virginia, have invented new and useful Improvements in Whiffletree-Hooks, of which the following is a specification.

My invention relates to improvements in whiffletree-hooks, and pertains to means for preventing the trace-hooks from becoming accidentally detached, which is a common occurrence when a wagon is going downhill or whenever the tension of the traces is relaxed, and at the same time permit the traces to be quickly attached or detached when desired, all of which will be fully described hereinafter and particularly pointed out in the claims.

In the accompanying drawings, Figure 1 is a perspective top plan view of one end of a whiffletree and hook. Fig. 2 is a longitudinal sectional view on the line 2 2 of Fig. 1, the forward position of the spring being shown in dotted lines. Fig. 3 is a vertical sectional view on the line 3 3 of Fig. 2. Fig. 4 is a horizontal longitudinal sectional view of the hook. Fig. 5 is a modified view showing my improved hook attached to the whiffletree by means of an ordinary staple.

Referring now to the drawings, the numeral 1 indicates one end of a whiffletree, and 2 a sleeve or cuff adapted to fit over the end of the whiffletree and having a laterally-extending U-shaped portion 4, which forms an eye, through which passes a ring 3 of the hook 5, the said hook being formed integral with the ring. The ring 3 may be secured to the end of the whiffletree by means of an ordinary staple 10, as shown in Fig. 5, or in any desired manner without departing from the spirit of my invention.

Secured to the stem 6 of the hook 5 by means of rivets is a flat leaf-spring 7, which is substantially L-shaped, its free end extending upward and normally at right angles to the stem 6 and adapted to close the opening in the hook.

The numeral 8 designates a portion of a trace-hook.

It will be seen that when the trace is inserted in the hook the free end of the spring 7 will be bent in, as shown in dotted lines in Fig. 2, permitting the trace to pass into the hook, after which the spring will close the entrance and prevent the trace from becoming detached until it is desired to unhook the same. The pressure of the trace-hook as it is slipped out will force the spring out, as will be readily understood.

Having thus described my invention, what I claim, and desire to secure by Letters Patent, is—

1. The combination with a whiffletree-hook, an L-shaped leaf-spring member secured to the shank of the hook and extending laterally adjacent the bill, substantially as described.

2. The combination with a whiffletree-hook, an L-shaped leaf-spring member having one end secured to the inner side of the shank parallel therewith, and the opposite end of the spring extending laterally adjacent the under side of the bill, substantially as described.

In testimony whereof I affix my signature in presence of two witnesses.

JOHN E. COOPER.

Witnesses:
A. A. HARRIS,
FRANK DEWEY.